UNITED STATES PATENT OFFICE.

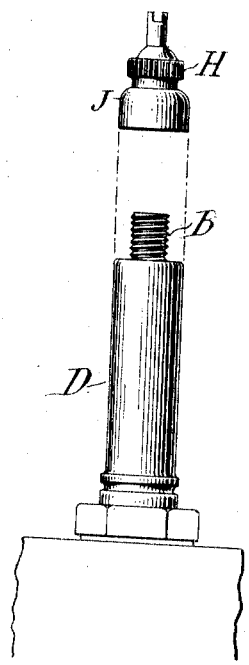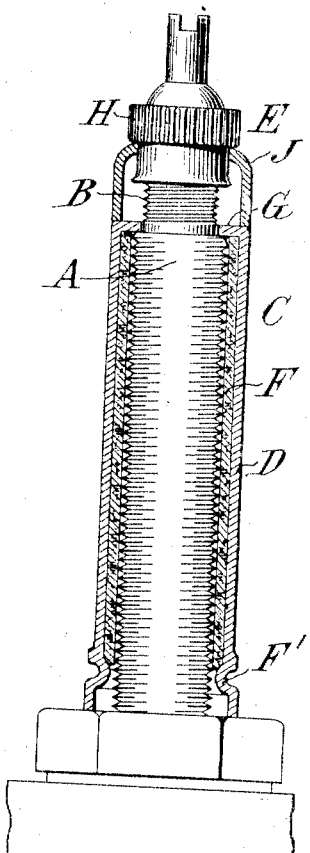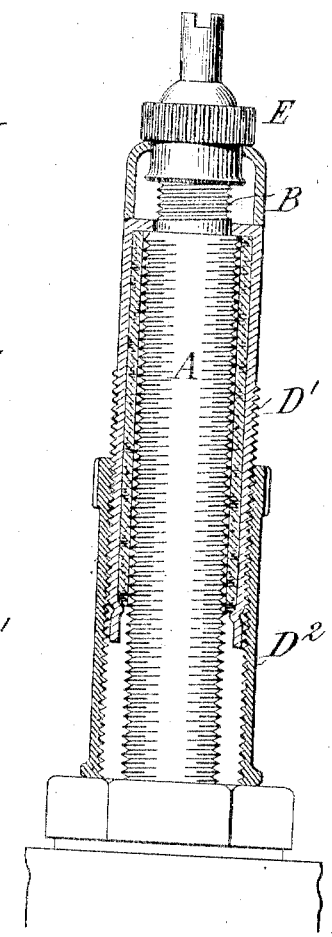

ROBERT H. HENEMIER, OF NEW YORK, N. Y., ASSIGNOR TO A. SCHRADER'S SON, INC., OF BROOKLYN, NEW YORK, A CORPORATION OF NEW YORK.

DUST-CAP FOR TIRE-VALVES.

1,390,707.  Specification of Letters Patent.  Patented Sept. 13, 1921.

Application filed December 18, 1918. Serial No. 267,360.

*To all whom it may concern:*

Be it known that I, ROBERT H. HENEMIER, a citizen of the United States of America, residing in the borough of Manhattan, city, county, and State of New York, have invented certain new and useful Improvements in Dust-Caps for Tire-Valves, of which the following is a specification.

This invention relates to dust caps for tire valves and aims to provide certain improvements therein.

The invention is directed to a dust cap which is adapted to perform also the function of a tire valve cap, the parts being constructed in such manner that either or both may be quickly attached or detached. This permits the quick application of a pump coupling, when it is desired to inflate the tire, and the quick detachment of the major portion of the structure when it is desired to remove the tire from the wheel rim. Preferably the detachment of the valve cap portion permits the removal of the dust cap portion by a sliding movement, and the application of the valve cap portion secures the dust cap portion in place.

The invention includes other features and improvements which will be hereinafter more fully described.

Referring to the drawings which illustrate several forms of the invention:—

Figure 1 is an elevation of the cap as applied to a tire valve, the valve cap portion being shown detached;

Fig. 2 is a diametrical section of the device, a part of the valve cap portion being shown in elevation; and Fig. 3 is a similar section of a modified form.

Referring first to Figs. 1 and 2, let A indicate a standard form of valve, having a nipple B of reduced diameter, adapted to receive a pump coupling or valve cap.

C indicates the dust cap as a whole, which comprises a dust cap portion D and a valve cap portion E. The dust cap portion D is preferably constructed with a cylindrical member adapted to slide down over the threads of the valve body, the upper end of the dust cap portion having a hole or passage through which the valve nipple extends when the dust cap portion is in place. Means are preferably provided to hold the dust cap portion in its adjusted position by friction, which should at least be sufficient to prevent the dust cap portion from slipping off the valve body when the latter is in inverted position. I have found that a layer or ring of cork, such as is indicated at F, serves this purpose admirably, and such ring may extend the entire length of the dust cap portion, as shown in Fig. 2, or may be reduced to a much smaller length, if desired. The partial or complete cork lining thus formed, has a further function in that it aids very materially against the ingress of dust or moisture at the bottom of the cap, the cork having the capacity, to some extent, of swelling so that it wholly or partially fills the threads on the exterior of the valve casing and, to a considerable extent, fills up the space left by the flats on the valve. An internal flange F' may be provided to prevent the cork lining from pulling out of the structure. Preferably, the dust cap portion is so formed that there is left a flange G at its top, which engages the usual shoulder on the valve casing between the body portion and the nipple B, thereby limiting the onward movement of the dust cap portion.

The valve cap portion, which is lettered E, in part may be formed of the standard valve cap, the internal construction being any that may be suitable for the purpose of sealing the outer end of the valve. The body of such cap is lettered H in the drawing. It carries, or is formed with a skirt portion J, which extends downwardly until it either contacts with the top of the dust cap portion D, or is in a close proximity thereto. The skirt portion J serves to protect the threads of the nipple and prevent ingress of dirt and dust, and also serves to clamp the dust cap portion D in place, so that its lengthwise removal is impossible, so long as the valve cap portion is in position on the valve nipple.

By the construction thus described, all of the threads of the valve casing are protected, including that of the nipple B. At the same time, the valve is easily accessible for purposes of inflation, and the entire structure may be removed or applied without a long screwing operation.

The construction of Figs. 1 and 2 is best adapted for valves having a standard or uniform degree of projection from the wheel felly. To accommodate those valves which have an indeterminate degree of projection, I prefer the construction of Fig. 3, wherein the dust cap portion is formed in two parts, D' and D², telescopically connected, so that when the section D' is in contact with the shoulder of the valve casing, the section D² may be adjusted downwardly until it meets the wheel felly. The connection between the two may be either a sliding connection or a screw-threaded connection, as is shown.

While I have shown and described several embodiments of the invention, it is to be understood that I do not wish to be limited thereto, since various changes may be made therein without departing from the spirit of the invention.

What I claim is:—

1. A dust cap comprising a dust cap portion and a valve cap portion, the dust cap portion being adapted to slide down over the valve casing and having a passage formed therein for the valve, and the valve cap portion being adapted to screw on the valve to hold the dust cap portion in place.

2. A dust cap comprising a dust cap portion and a valve cap portion, the dust cap portion being adapted to slide down over the valve casing and having a passage formed therein for the valve nipple, and the valve cap portion being adapted to screw on the valve nipple, and having a skirt portion adapted to contact with the dust cap portion to hold the latter in place.

3. A dust cap having a dust cap portion and a valve cap portion, the dust cap portion being adapted to slide along the valve casing and being formed in two parts telescopically connected, and the valve cap portion being adapted to engage the valve nipple and engaging the end of the dust cap portion to hold the latter in place.

In witness whereof, I have hereunto signed my name.

ROBERT H. HENEMIER.